(12) United States Patent
Smith et al.

(10) Patent No.: US 7,354,341 B1
(45) Date of Patent: Apr. 8, 2008

(54) SYSTEM AND METHOD FOR DETECTING AN AIR FLOW CONDITION INDICATIVE OF PLUGGING OF A DISCHARGE APPARATUS OF AN AGRICULTURAL COMBINE

(75) Inventors: Dwayne B. Smith, Lancaster, PA (US); Denver R. Yoder, Manheim, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/729,620

(22) Filed: Mar. 29, 2007

(51) Int. Cl.
*A01D 75/18* (2006.01)
*A01F 12/16* (2006.01)
*A01F 21/00* (2006.01)

(52) U.S. Cl. .......................................................... 460/4
(58) Field of Classification Search ..................... 460/6, 460/4, 111, 112; 340/684; 56/13.3, 71, 202, 56/320.2
See application file for complete search history.

(56) References Cited

U.S. PATENT DOCUMENTS

| 3,863,428 A | 2/1975 | Baxter ..................... 56/10.2 R |
| 4,072,934 A | 2/1978 | Hiller et al. ................. 340/608 |
| 4,176,617 A | 12/1979 | Pilipski ........................ 116/70 |
| 4,286,424 A | 9/1981 | Hubbard .................. 56/10.2 R |
| 4,589,425 A | 5/1986 | Mitchell, Jr. ................. 460/90 |
| 4,635,047 A | 1/1987 | Fox et al. .................... 340/684 |
| 4,751,501 A | 6/1988 | Gut ............................ 340/607 |
| 5,321,939 A * | 6/1994 | Fuse et al. ................ 56/10.2 R |
| 5,425,223 A | 6/1995 | DeLaRonde ............. 56/10.2 R |
| 5,604,306 A | 2/1997 | Schricker ................... 73/118.2 |
| 5,832,708 A * | 11/1998 | Sugden ........................ 56/202 |
| 5,923,262 A | 7/1999 | Fuss et al. ................. 340/684 |
| 2004/0041710 A1 | 3/2004 | Kwon ........................ 340/607 |
| 2005/0245300 A1* | 11/2005 | Maertens et al. ............. 460/59 |
| 2006/0246966 A1 | 11/2006 | Smith ......................... 460/112 |
| 2007/0135935 A1* | 6/2007 | Maertens et al. ............. 700/28 |

* cited by examiner

*Primary Examiner*—Árpád Fábián Kovács
(74) *Attorney, Agent, or Firm*—Michael G. Harms; John William Stader; Patrick M. Sheldrake

(57) ABSTRACT

A system and method for detecting a condition indicative of onset of plugging or actual plugging of discharge apparatus of an agricultural combine, utilizing an air flow sensor disposed in relation to the discharge apparatus for sensing one or more air flow characteristics or conditions indicative of at least the onset of a plugging condition.

20 Claims, 4 Drawing Sheets

SYSTEM AND METHOD FOR DETECTING AN AIR FLOW CONDITION INDICATIVE OF PLUGGING OF A DISCHARGE APPARATUS OF AN AGRICULTURAL COMBINE

TECHNICAL FIELD

The present invention relates generally to a system and method for detecting an air flow condition indicative of plugging of a discharge apparatus for crop residue discharged from an agricultural combine, and more particularly, for detecting an air flow condition indicative of the onset of plugging, to allow avoiding occurrence of actual plugging and the requirement of removing the plug from the apparatus or the inlet region thereof.

BACKGROUND ART

Agricultural combines are well known in the art for harvesting and threshing various agricultural crops, including for example, wheat, soybeans, corn, etc. Usually, agricultural combines include a harvesting apparatus, an infeed mechanism, a separating or threshing apparatus, and a cleaning apparatus. In operation, the harvesting apparatus reaps the crop, which is planted in the ground. After reaping, the infeed mechanism feeds the crop to the separating or threshing apparatus.

Typically, the separating apparatus in a rotary combine includes at least one rotor, which can extend axially (front to rear) or transversely within the body of the combine, and which is surrounded at least in part by a perforated concave having a plurality of apertures. The grain is threshed and separated by the separating apparatus, and the separated grain, together with some impurities, such as chaff, dust, and crop residue particles, are fed to a cleaning system to clean the impurities from the grain. Clean grain is collected below the cleaning system and fed to a grain tank for temporary storage. The clean grain, impurities and smaller elements and particles of the crop residue are separated form the bulk of the crop residue by the separating apparatus and the resulting residue is delivered for processing by a discharge delivery system.

While the terms "grain" and "crop residue" are used principally throughout this specification for convenience, it should be understood that these terms are not intended to be limiting. Thus "grain" refers to that part of the crop which is threshed and separated from the discardable part of the crop material (e.g. straw), which is referred to as "crop residue".

Discharge delivery systems rely on a device such as a discharge beater or straw walker, to propel or convey the separated crop residue rearwardly within a body of the combine to a residue handling system. Generally, straw walkers, which involve crank mechanisms for conveying the crop residue rearwardly through a combine, are relatively slow in operation and thus have a limited material handling capability or rate. The crank mechanisms add complexity and vibration. Discharge beaters "throw" or propel the crop residue away from the separator and toward the rear of the combine. In both instances, the crop residue can be discharged discharged directly in its raw form through a rear opening of the combine onto the harvested field; it can be directed into a chopper mechanism in connection with the rear of the combine which chops the crop residue and then discharges it onto the harvested field; or the chopper can function just as a spreader for spreading the unchopped crop residue onto the field.

Today's new, improved combines have greater harvesting and threshing capacities. Although discharge systems such as briefly discussed above have also improved, the harvesting and threshing systems of modern combines can at times produce volumes of crop residue material that can exceed the capacity of the discharge systems, leading to plugging thereof and packing of crop residue thereagainst and over the cleaning system, which can require substantial down time and effort to remove. In some instances, the only warning of plugging is when an operator notices that crop residue is no longer being discharged or is being discharged at a rate which appears to be too low or the pattern of discharge is incorrect. For instance, in this latter regard, if one side of the crop flow path to the chopper is plugged, the corresponding portion of a swath of a field over which the chopped residue is to be spread or distributed may be covered with less residue compared to the opposite side, which may be unsatisfactory. Therefore, it would be advantageous if accurate early warning or information indicative of onset of a plugging condition were provided, to allow an operator or automatic control to take steps to avoid further or increased plugging, such as decreasing the combine ground speed to reduce the crop material throughput so as to clear the condition, and avoid more extensive plugging and the down time and effort to remove it.

As an additional problem, crop residue directed toward a plugged or partially plugged chopper can be deflected onto a chaff handling system of the combine, if present, so as to interfere with the proper operation thereof and its effectiveness, thereby also resulting in combine down time, decreases in harvesting productivity, and increases in operator and owner dissatisfaction and component failure. Therefore, it would be advantageous to avoid this problem also.

Accordingly, what is sought is a system or method for detecting a plugging of a crop residue chopper of a combine, and particularly the onset of such plugging, which provides one or more advantages, and overcomes one or more problems, set forth above.

SUMMARY OF THE INVENTION

With this invention, a system and method for detecting an air flow condition indicative of onset of plugging or actual plugging of a crop residue discharge apparatus of an agricultural combine, particularly a chopper or the like, which provides one or more of the advantages, and overcomes one or more problems, set forth above, is disclosed.

According to a preferred aspect of the invention the combine includes a body defining a space containing a separating or threshing system, a rear opening spaced rearwardly of the separating system, and a crop residue propeller disposed in the space in a position for receiving crop residue from the separating system and directing a flow of the crop residue rearwardly along a flow path from the separating system toward the rear opening. The combine includes a rotary crop residue discharge apparatus disposed adjacent to the rear opening and in the flow path, the discharge apparatus including an inlet opening positioned for receiving at least a portion of the flow of crop residue, and the apparatus being configured and rotatably operable for propelling the crop residue from the combine. The combine additionally includes an air flow sensor disposed and configured for sensing an air flow condition indicative of onset of plugging of the inlet opening and outputting a signal representative thereof. This onset can include, for example, a build up of crop residue along a front edge or surface of a housing defining the inlet opening, and, if not cleared, or if the condition or conditions causing the build up are not reduced, will provide a base on which crop residue material can continue to build up to form a plug blocking the inlet opening.

The above components make up a system for detecting preferably the onset of a plugging condition, and which can output information representative thereof to an appropriate destination such an operator or other personnel, and/or to a control, such that appropriate responsive action can be taken, such as slowing the ground speed of the combine to reduce the volume or rate of crop material directed to the discharge apparatus, and/or changing an operating parameter setting, such as a threshing system setting; or a discharge apparatus setting such as the rotational speed thereof, or any combination of the above. In this regard, according to a preferred aspect of the invention, the air flow sensor is connected to a control in connection with a display or other signal device in an operator cab of the combine, so as to be operable for outputting signals representative of the air flow condition indicative of the onset of plugging to the control, and/or to an operator, such that an appropriate corrective action can be taken.

According to another preferred aspect of the invention, the discharge apparatus is a rotary crop residue chopper, and further preferably, the chopper is operable for generating and inducing a flow of air into the inlet opening, and it is a portion of this flow of air which can be monitored for conditions indicative of the onset of plugging. For example, an air flow sensor can be disposed adjacent to the flow on a side of the body of the combine. As another example, air flow sensors can be disposed adjacent to the flow on opposite sides of the combine. In still another example, for a typical arrangement including a chopper having an upwardly facing inlet opening disposed in an upper region of the rear opening of the combine, above a lower region of the rear opening, the air flow sensor or sensors can be positioned adjacent to an air flow path extending between the lower region of the opening and the inlet opening.

According to still another optional aspect of the invention, the air flow sensor or sensors, can be configured and operable for sensing air flow parameters or conditions which can include, but are not limited to, air speed and/or direction. And, the control can be operable for determining onset of a plugging condition as a function of one or more of these parameters, and optionally other parameters such as combine ground speed, threshing or separating system speed, discharge apparatus speed, and/or cleaning system fan speed. Examples of types of air flow sensors that may be used in the present invention include well known, commercially available mass flow sensors including hot wire and cold wire mass air flow sensors, and semi-conductor devices.

BRIEF DESCRIPTION OF THE DRAWINGS

These and other advantages of the present invention are best understood with reference to the drawings, in which.

DETAILED DESCRIPTION OF THE INVENTION

Figure 1:
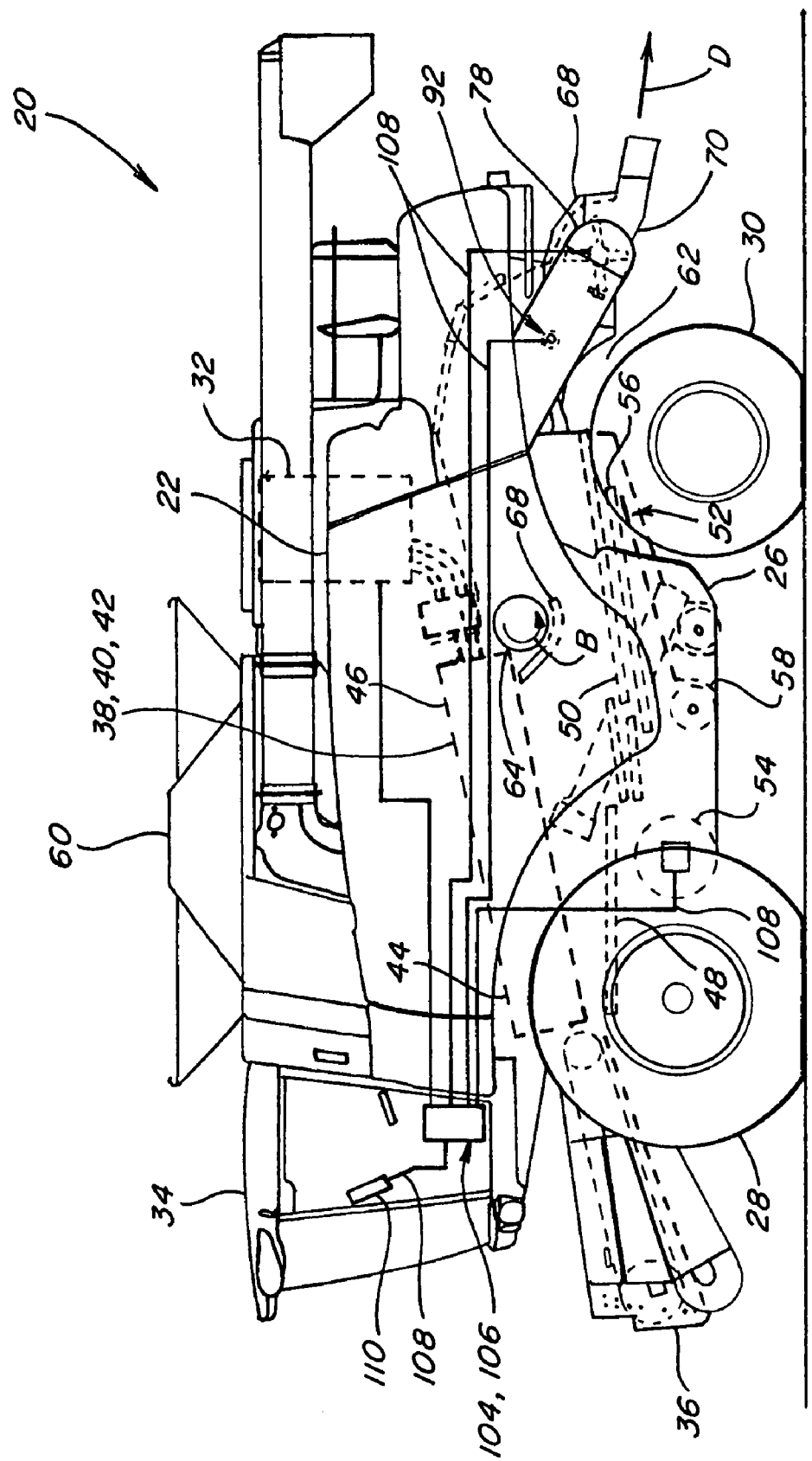
FIG. 1 is a side view of an agricultural combine including a system according to the invention for detecting plugging of a discharge apparatus of the combine.
Figure 2:
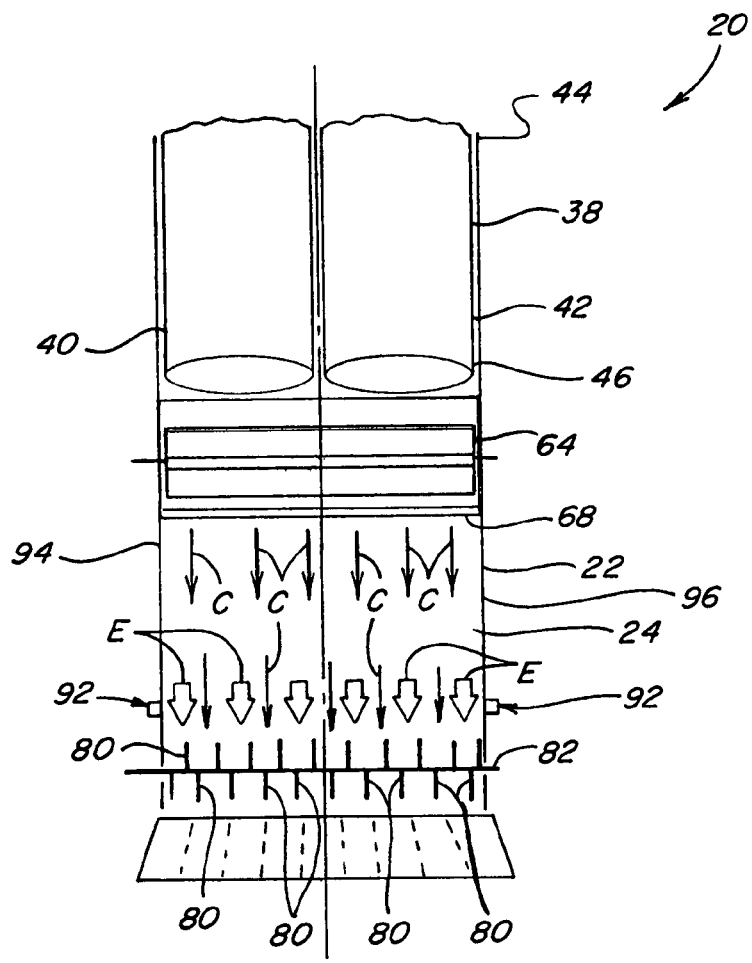
FIG. 2 is a simplified schematic top view of a separating system and a discharge apparatus of the combine in association with representative air flow sensors of the invention, showing air and crop residue flows in relation thereto.

Referring to the drawings, FIGS. 1, 2, 3 and 4, show a self-propelled rotary combine 20 that includes a housing or body 22 defining an internal open area or space 24. The body 22 of the combine 20, which can include a supporting frame 26, is supported on front drive wheels 28 and steerable rear wheels 30. The combine 20 is powered by an engine 32 controlled from an operator cabin 34.

A crop harvesting apparatus, otherwise referred to as a header (not shown), and a feeder mechanism 36 are attached at a forward end of the combine 20, in the well-known manner. The feeder mechanism 36 feeds crop materials to a threshing system 38 enclosed within body 22. Here, combine 20 is illustrated as including a separating or threshing system 38 including a pair of side by side, forwardly and rearwardly extending rotors 40 and 42, rotatable within concave enclosures and including interacting threshing elements for threshing crop materials presented thereto into grain and crop residue materials, also in the well known manner. However, it should be appreciated that the rotary combine 20 could be configured with a different threshing system, for example, one with a single rotor, either forwardly and rearwardly extending or sidewardly extending. Essentially, in operation, between the upstream, or front end 44, and the downstream, or rear end 46, of rotors 40 and 42, the crop material is threshed as it spirals around rotors 40 and 42 against concaves disposed at least partially, circumferentially around the respective rotors. The rotors 40 and 42 can be dimensioned with a broad range of diameters, depending on the desired size and performance characteristics of the combine 20. The concaves have a plurality of apertures that allow the grain to be separated from the other crop material as the grain passes through the apertures. Some of the grain drops onto a grain pan 48 and is conveyed rearward therealong to an upper sieve 50 of a cleaning system 52, and some of the grain will fall directly onto sieve 50.

The cleaning system 52 cleans chaff, crop residue, tailings and other foreign material from the grain. Cleaning system 52 includes a cleaning fan 54, upper sieve 50, a lower sieve 56 below upper sieve 50, and a clean grain collector 58 therebelow, all operable in the well-known manner and shown in FIG. 1. A suitable conveyor mechanism (not shown) can direct clean grain from the clean grain collector 58 into a hopper or grain bin 60. The cleaning fan 54 directs a flow of air, denoted by large arrows A, upward and rearwardly through sieves 50 and 56, and rearwardly through space 24, for blowing the chaff and other particles from the grain and from space 24 through a lower region of a rear opening 62 of the combine.

Crop residue and other waste crop material are propelled rearwardly from rear end 46 of threshing system 38 by a rotary beater 64 which rotates, as denoted by arrow B to "throw" or propel, as denoted by arrows C, an airborne flow of crop residue and other waste material, particularly straw, through the space 24 rearwardly toward the rear end of the space 24. A crop residue discharge apparatus which is depicted here as a conventionally constructed rotary chopper 68, is disposed and supported in upper region 66 of the rear opening, in a position for receiving the flow of crop residue C. Chopper 68 includes a housing 70 including an inlet opening 72 which opens to space 24 and is preferably oriented to face generally forwardly and upwardly for receiving flows C. Housing 70 includes a front edge portion 74 defining and bounding a front periphery of opening 72. Chopper 68 additionally includes a rotary impeller 76 contained within housing 70 and rotatable by a suitable drive such as belt drive 78 (FIG. 1), for propelling the crop material through and rearwardly from housing 70, as denoted by arrows D, so as to be distributed in a desired manner on a harvested field, in the well known manner. Impeller 76 includes a plurality of knives 80 supported on a center rotatable shaft 82 for rotation therewith, which knives can be, for instance, flail type knives of any of the well known varieties. Such knives 80 can be configured, for instance, so as to have blade-like features or orientations, such as angular orientations relative to the direction of travel, for generating an air flow which is inducted through inlet opening 72, for instance, as denoted by arrows E. Chopper 68 additionally is illustrated including a row of fixed knives 84 which are disposed beneath inlet opening 72 between the rotary paths of adjacent ones of knives 80, for chopping the crop material as it is propelled therepast by knives 80. Here, it should be noted that fixed knives 84 are optional, and can be removed or withdrawn, such that rotating knives 80 will propel the crop material from chopper 68 without significantly chopping it.

The flow of the crop residue propelled rearwardly by beater 64 will typically comprise elements of varying size, mass and other characteristics. For instance, it can be expected that a wad or wads of weeds, vines or tough or green crop residue propelled rearwardly by beater 64 may not travel as far through space 24 compared to lighter individual elements of the crop residue such as individual straws and the like. This can be due to the larger size of the wad, and also greater weight compared to the lighter elements. As a result, it has been found that such wads and larger and/or heavier elements of the crop residue can have a tendency to fall down at more forward locations within the space 24. Moisture conditions such as humidity and moisture content of the crop residue can also be a factor in propensity toward this occurrence. It has been observed that such wads, and increases in crop material flow generally, can result in build up of the crop material in, and in the vicinity of, inlet opening 72, particularly, on front edge 74, as illustrated by a representative build up 86 of crop material on front edge 74 in FIG. 4. If this build up is allowed to increase, as the result of the volume of crop material typically being processed, it can block crop material flow C into inlet opening 72, such that inlet opening 72 will become partially or fully plugged, as illustrated by the dotted line 88 (partial plug), and dotted line 90 (fully plugged) in FIG. 4. Any such plug which interferes with the throughput of material will have to be removed to enable continued operation of the chopper, thereby resulting in inconvenience, dissatisfaction and downtime.

Figure 3:
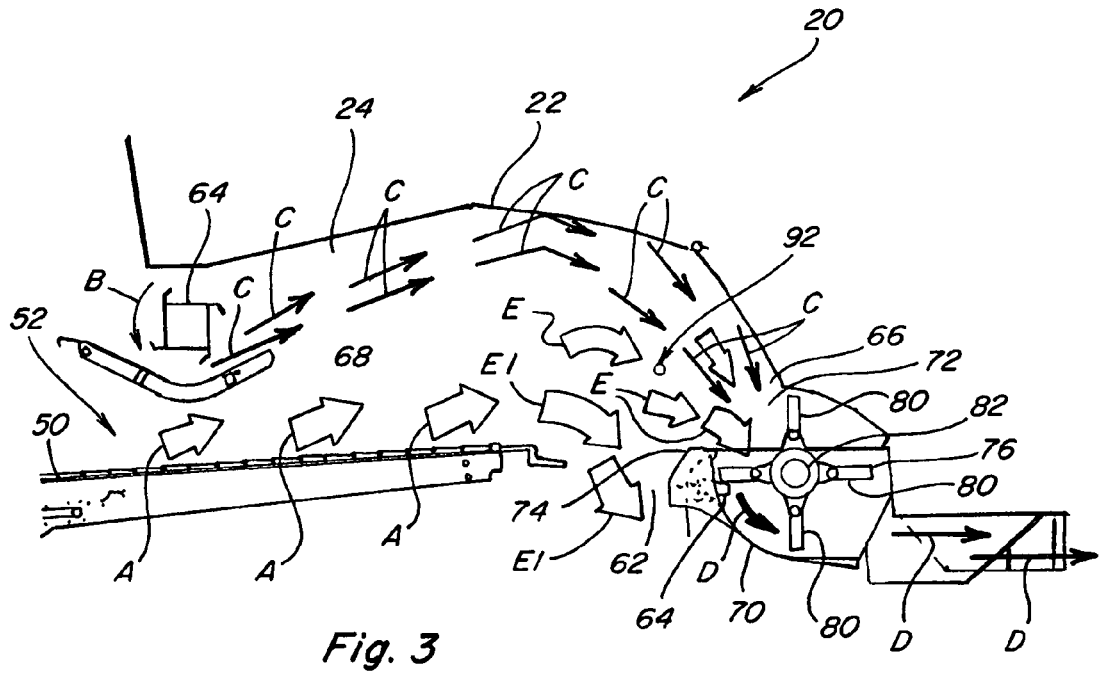
FIG. 3 is simplified schematic side view of the separating system and the discharge apparatus, showing an air flow sensor of the invention and the air and crop residue flows in relation thereto.
Figure 4:
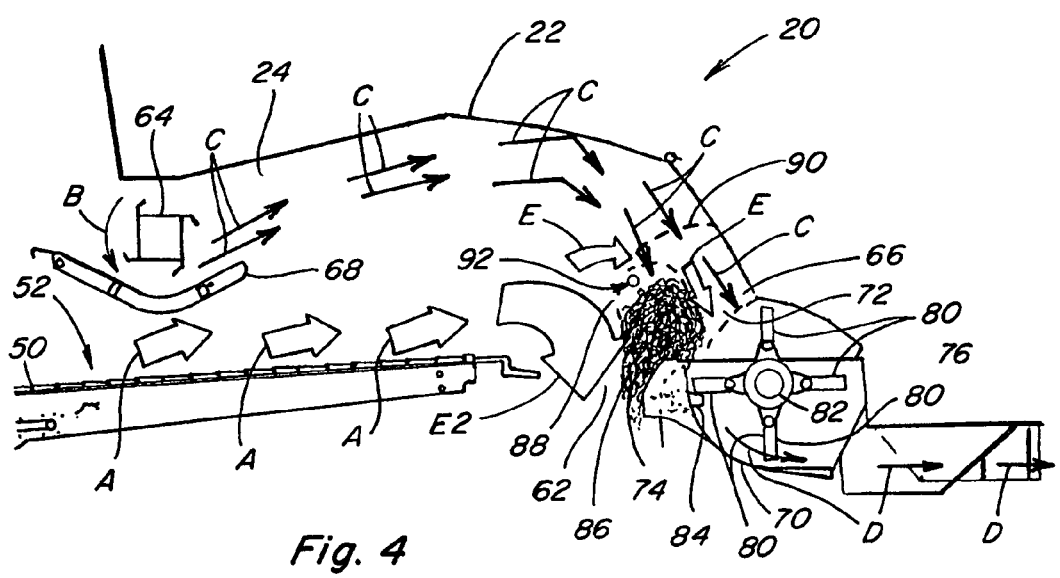
FIG. 4 is another simplified schematic side view of the separating system and the discharge apparatus, showing an air flow sensor of the invention and the air and crop residue flows in relation thereto with the onset of a plugging condition present.

Referring more particularly to FIGS. 3 and 4, it has been observed that as crop material begins to build up, as illustrated by build up 86 (FIG. 4), air flow characteristics within the rear end of space 24 will be affected, particularly, flows of air E inducted into inlet opening 72. Such effects can include, but are not limited to, diversion or redirection of the flows of air E from their normal paths, some of which will be directly over front edge 74, to other locations, such as above and around the build up. As an example, when little or no build up is present (FIG. 3), some portion of air flows A generated by cleaning system 52 will be inducted into inlet opening 72 of chopper 68, and some portions will flow rearwardly and downwardly through lower region 62 of the rear opening, as denoted by arrows E1. During the onset or initiation of a build up of crop material, such as build up 86 illustrated in FIG. 4, the patterns of the air flows will be disrupted, as the direct path from upper sieve 50 to inlet opening 72 becomes increasingly blocked or obstructed. The induction capability of chopper 68 may also be reduced. This is expected to cause some reduction, redirection, and/or change in air flows E toward and into inlet opening 72. It has been found that such changes in air flow characteristics can be monitored, and, when present, can be used to determine the onset of a plugging condition, such that steps can be taken to dissolve the plug and avoid the creation of a greater plug.

Figure 5A:
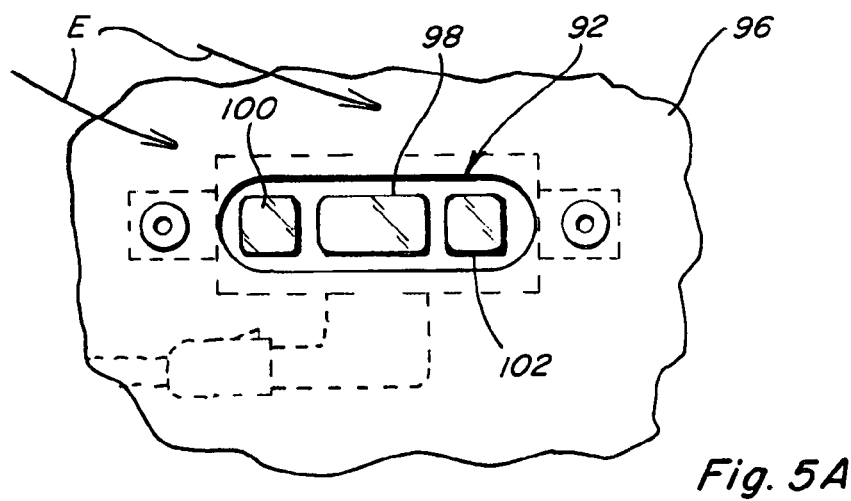
FIG. 5A is an enlarged side view showing another representative air flow sensor for use with the system of the invention, installed in a side wall of the combine of FIG. 1.
Figure 5:
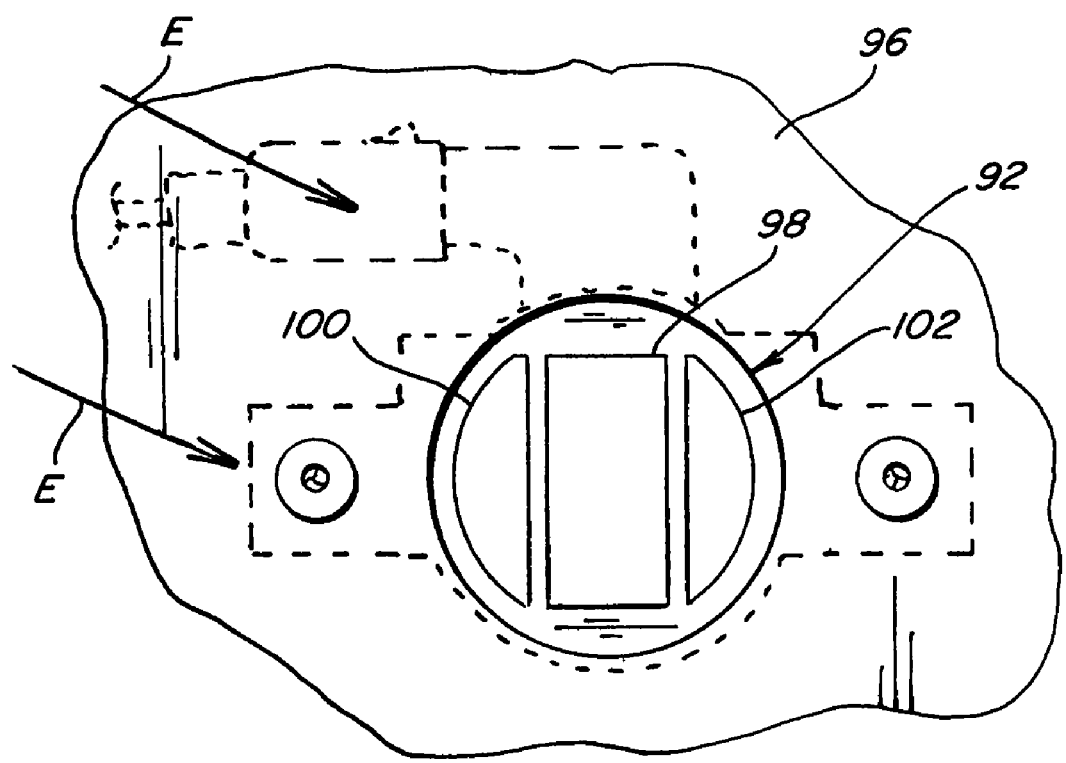
FIG. 5 is an enlarged side view showing a representative air flow sensor for use with the system of the invention, installed in a side wall of the combine of FIG. 1.

Referring also to FIGS. 5 and 5A, according to the present invention, at least one air flow sensor 92 is utilized, which is configured and positioned for monitoring the existence of air flow conditions indicative of an onset of a plugging condition, such as represented by build up 86 in FIG. 4. Preferably, air flow sensor or sensors 92 are located in, on, or in the vicinity of one or both side walls 94 and 96 of body 22, in positions so as to be exposed to air flows E toward or into inlet opening 72. Further in this regard, as illustrated in FIGS. 3 and 4, air flow sensors 92 are located in spaced relation to, and above, inlet opening 72 so as to be located directly adjacent to the flow paths of air flows E, just below the flow paths of the crop material flows C. Air flow sensor or sensors 92 can be configured and operable for sensing air flow parameters or conditions which can include, but are not limited to, air speed and/or direction, and in particular, pertinent changes in those parameters. Examples of types of air flow sensors that may be used in the present invention include well known, commercially available mass flow sensors including hot wire and cold wire mass air flow sensors, and semi-conductor devices such as devices utilizing electronic elements or membranes exposed to the air flow. In this latter regard, the sensor 92 includes a heat source 98 and one or more temperature sensors adjacent to heat source 98, for instance, a temperature sensor 100 on an upstream side relative to the normal or expected direction of flows E, and a temperature sensor 102 on a downstream side, as illustrated in FIGS. 5 and 5A.

Heat source 98 and sensors 100 and 102 of an air flow sensor 92 can be, for instance, well known, commercially available devices, such as membrane type devices, which are advantageous as they are flat so as to be unobtrusive to the air and crop residue flows. In operation, in the absence of air flow thereover or therepast, the temperature profile across the two temperature sensors 100 and 102 of sensor 92 would be expected to be at least generally uniform. When air flows across the sensor 92, the upstream temperature sensor cools differently than the downstream side. Thus, the presence of air flow can be determined from differences between sensors 100 and 102. Similarly, changes in the cooling between temperature sensors 100 and 102 can be indicative of changes in air flow, some of which changes will represent changes in air flows resulting from a build up of crop material, such as build up 86 illustrated in FIG. 4. Absence of air flow, or a reduction in air flow, such as may occur when a build up, such as build up 86, reaches a level corresponding to dotted line 88, will also be indicative of the onset of a plug. Sensor 92 is configured and operable for outputting signals representative of such changes and differences in the cooling of sensors 100 and 102, which signals can then be used by a control, or directly by an operator, for initiating a corrective action, such as slowing the ground speed of combine 22 to thereby decrease the intake of crop material, and such that, for instance, those portions of crop material flows C impinging a build up such as build up 86, will break up and/or drive or induct the built up crop material into chopper 68. In this regard, the outputted signal can be a conventional analog signal, or a digital signal. It should also be noted that a sensor, particularly, such as sensor 92 illustrated in FIG. 5, can be configured so as to be adjustably rotatably positionable in an advantageous orientation for detecting a particular change in direction of air flow.

Referring more particularly to FIG. 1, an example of a preferred system 104 including a sensor or sensors 92 and operable for detecting the onset of a plugging condition according to the present invention, is shown. System 104 includes a control 106, which is preferably a microprocessor operated controller, connected to sensor or sensors 92 by a conductive path 108, which can be, for instance, a wire or wires of a wiring harness, a wireless network, or communications bus, for receiving the signals outputted thereby. Control 106, in turn, is connected by another conductive path 108 to a signal device 110 preferably located within operator cabin 34, which device 110 can include, but is not limited to, a visual display device, such as an LCD screen, a warning light, and/or an audible signal generating device. Control 106 can also optionally be connected by conductive paths 108 to the drives of cleaning fan 54 and chopper 68, for receiving information representative of the operating speeds thereof, as well as with other sensors and other devices (not shown) of various systems of combine 20, for receiving information therefrom. Control 106 can be programmed to determine the existence of the onset of a plugging condition, for instance, as caused by a build up of crop material, such as build up 86, as a function of the signals received from sensor or sensors 92, as well as other sensed parameters, such as, but not limited to, a ground speed of combine 20, an operating speed of fan 54, and a speed of chopper 68. Thus, for instance, control 106 can be programmed to adjust for different operating speeds of fan 54 which would be anticipated to generate different speeds of air flows E past sensors 92. Examples of other parameters that can be sensed and utilized by control 106 for determining the existence of the onset of a plugging condition can include a speed of operation of threshing system 38 and/or beater 64, air flow or air pressure conditions in other regions of space 24, for instance, above upper sieve 50 of cleaning system 52, and operating conditions of other optional equipment, such as a chaff spreader (not shown). Other inputs can be utilized in conjunction with the above sensed parameters, including operator inputs for crop type, and the like.

Control 106 can additionally optionally be programmed to automatically execute an action, such as the slowing of the ground speed of combine 20, or other suitable action, in response to the sensed onset of a plugging condition, for avoiding a more disruptive plug, and possibly for removing the crop residue build up.

Alternatively, or in cooperation with an automatically executed action, control 106 can operate signal device 110 to output a message and/or signal to an operator, to enable the operator to take a corrective action, such as the slowing of the ground speed or the like, as discussed above.

Although an exemplary embodiment of the system and method for detecting onset or actual plugging conditions in a discharge apparatus of a combine has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An agricultural combine comprising:
   a body defining a space containing a separating system, and a rear opening spaced rearwardly of the separating system;
   a crop residue propeller disposed in the space in a position for receiving crop residue from the separating system and directing a flow of the crop residue rearwardly along a flow path from the separating system toward the rear opening;
   a rotary crop residue discharge apparatus disposed adjacent to the rear opening and in the flow path, the discharge apparatus including an inlet opening positioned for receiving at least a portion of the flow of crop residue, and the apparatus being configured and rotatably operable for propelling the crop residue from the combine; and
   an air flow sensor disposed and configured for sensing an air flow condition indicative of onset of plugging of the inlet opening and outputting a signal representative thereof.

2. The agricultural combine of claim 1, wherein the air flow sensor is mounted in a side wall of the body spaced generally above an edge portion bounding a forward peripheral region of the inlet opening.

3. The agricultural combine of claim 2, further comprising a second air flow sensor mounted in a second side wall of the body spaced generally above the edge portion bounding the forward peripheral region of the inlet opening.

4. The agricultural combine of claim 1, wherein the discharge apparatus will generate and induct an air flow into the inlet opening when rotatably operated, and wherein the combine further comprises a cleaning system disposed in the space below the crop residue propeller and including a fan disposed and operable for directing a flow of air rearwardly in the space, such that the discharge apparatus when rotatably operating and the inlet opening is unobstructed, will induct at least some of the flow of air into the inlet opening, and wherein the sensor is configured for sensing changes in the flow of air toward the inlet opening representative of the onset of plugging thereof and outputting a signal representative thereof.

5. The agricultural combine of claim 1, wherein the crop residue discharge apparatus is a crop residue chopper.

6. The agricultural combine of claim 1, further comprising a control in connection with the air flow sensor for receiving the signal when outputted thereby, the control being connected to a signal device in an operator cab of the combine, the control being operable for operating the signal device to output a signal indicative of onset of a plugging condition responsive to receipt of the signal from the air flow sensor.

7. The agricultural combine of claim 6, further comprising a cleaning system including a fan controllable for operating at a selectable speed for generating and directing a flow of air rearwardly into the space, the control being operable for determining the existence of the onset of plugging of the inlet opening as a function of at least a sensed air flow condition and a speed of the fan.

8. The agricultural combine of claim 1, wherein the discharge apparatus is configured and operable for generating and inducting a flow of air into the inlet opening when propelling the crop residue from the combine and the air flow sensor is disposed and configured for sensing a condition of the flow of air indicative of onset of plugging of the inlet opening.

9. The agricultural combine of claim 8, further comprising a cleaning system including a fan controllable by the control for operating at a selectable speed for generating and directing a flow of air rearwardly into the space and outwardly from the space through a lower portion of the rear opening located generally below the inlet opening, the air flow sensor being disposed in the space generally between the inlet opening and the lower portion of the rear opening, so as to be operable for sensing changes in air flow between the lower portion of the rear opening and the inlet opening.

10. The agricultural combine of claim 1, wherein the air flow condition indicative of onset of plugging of the inlet opening comprises an air speed.

11. The agricultural combine of claim 1, herein the air flow condition indicative of onset of plugging of the inlet opening comprises a direction of air flow.

12. An agricultural combine, comprising:
a body defining a space including a forward region containing a separating system, and a rear region including a rear opening;
a crop residue propeller disposed generally between the separating system and the rear opening and operable for propelling a flow of crop residue rearwardly along a crop flow path from the separating system toward the rear opening;
a cleaning system disposed in the space below the rotary beater and including a fan disposed for directing a flow of air rearwardly through the space;
a rotary crop residue chopper disposed in an upper region of the rear opening and including an inlet opening positioned in the crop flow path for receiving at least a portion of the flow of crop residue propelled therealong and at least a portion of the flow of air; and
an air flow sensor disposed adjacent to the crop flow path and the inlet opening and operable for sensing an air flow condition indicative of at least partial plugging of the inlet opening.

13. The agricultural combine of claim 12, wherein the portion of the flow of air will flow along a predetermined air flow path to the inlet opening and the air flow sensor is mounted in a side wall of the body adjacent to air flow path.

14. The agricultural combine of claim 12, wherein the inlet opening is generally upwardly facing and the air flow sensor is located above and forwardly thereof.

15. The agricultural combine of claim 12, wherein the crop residue chopper comprises a plurality of blades which are rotated during operation thereof and which are configured for inducting air through the inlet opening and into the chopper.

16. The agricultural combine of claim 12, further comprising a control in connection with the fan, the air flow sensor and a signal device in an operator cab of the combine, the control being operable for receiving signals from the air flow sensor representative of the air flow condition indicative of at least partial plugging of the inlet opening, and responsively causing the signal device to output a signal representative thereof.

17. The agricultural combine of claim 16, wherein the control is operable for causing the signal device to output the signal representative of at least partial plugging of the inlet opening as a function also of a speed of rotation of the fan.

18. The agricultural combine of claim 10, wherein the air flow condition indicative of at least partial plugging of the inlet opening comprises an air speed.

19. The agricultural combine of claim 10, wherein the air flow condition indicative of at least partial plugging of the inlet opening comprises a direction of air flow.

20. A method of operation of an agricultural combine comprising steps of:
providing a body defining a space containing a separating system, and a rear opening spaced rearwardly of the separating system;
providing a propeller disposed in the space between the separating system and the rear opening and operable for propelling a flow of crop residue rearwardly along a crop flow path from the separating system toward a rear end of the space;
providing a rotary crop residue chopper disposed in at least a portion of the rear opening and including an inlet opening positioned in the crop flow path for receiving at least a portion of the flow of crop residue;
providing an air flow sensor disposed adjacent to the crop flow path and the inlet opening and operable for sensing an air flow condition indicative of at least partial plugging of the inlet opening and outputting a signal representative thereof; and
controlling a speed of movement of the combine as a function of the air flow condition when sensed.

* * * * *